US008588385B2

(12) United States Patent  (10) Patent No.: US 8,588,385 B2
Kuhlke et al.  (45) Date of Patent: Nov. 19, 2013

(54) RICH CALLER ID WITH COMMUNICATION HISTORY

(75) Inventors: Matthew R. Kuhlke, San Francisco, CA (US); Alan Darryl Gatzke, Bainbridge Island, WA (US); Matthew Malcolm Penning, Vashon, WA (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 12/533,402

(22) Filed: Jul. 31, 2009

(65) Prior Publication Data

US 2011/0026698 A1  Feb. 3, 2011

(51) Int. Cl.
*H04M 1/56* (2006.01)
(52) U.S. Cl.
USPC .................................................... 379/142.04
(58) Field of Classification Search
USPC ........... 455/412.1–413, 565–567; 379/142.04
See application file for complete search history.

(56) References Cited

U.S. PATENT DOCUMENTS

| | | | |
|---|---|---|---|
| 7,106,851 B2 * | 9/2006 | Tang et al. | 379/355.01 |
| 7,158,625 B2 * | 1/2007 | Casaccia | 379/207.02 |
| 7,418,090 B2 * | 8/2008 | Reding et al. | 379/202.01 |
| 7,720,218 B2 * | 5/2010 | Abramson et al. | 379/428.03 |
| 8,132,120 B2 * | 3/2012 | Stallings et al. | 715/848 |
| 2005/0280660 A1 * | 12/2005 | Seo et al. | 345/629 |
| 2006/0222152 A1 * | 10/2006 | Elias et al. | 379/88.13 |
| 2006/0267917 A1 * | 11/2006 | Miernik et al. | 345/102 |
| 2007/0165808 A1 * | 7/2007 | Pieraccini et al. | 379/142.04 |
| 2008/0126490 A1 * | 5/2008 | Ahlenius et al. | 709/206 |
| 2009/0075631 A1 * | 3/2009 | Lyle et al. | 455/412.2 |
| 2009/0312067 A1 * | 12/2009 | Ahlin | 455/567 |

* cited by examiner

*Primary Examiner* — Duc Nguyen
*Assistant Examiner* — Assad Mohammed
(74) *Attorney, Agent, or Firm* — Tucker Ellis LLP

(57) ABSTRACT

In an example embodiment, there is described a unified communication system that automatically presents a number of communication attempts from a caller since last contact with a caller, along with the caller identification information. Optionally, links may be provided to access detailed information about the past communication attempts.

16 Claims, 3 Drawing Sheets

_US 8,588,385 B2_

RICH CALLER ID WITH COMMUNICATION HISTORY

TECHNICAL FIELD

The present disclosure relates generally to communications such as person to person communications.

BACKGROUND

Modern communication systems provide users with a multiplicity of options for communicating with each other. For example, users may communicate via telephone, voice mail, text (e.g. Short Message Service or "SMS") messaging, electronic mail (e-mail), Instant Messaging ("IM"), etc.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
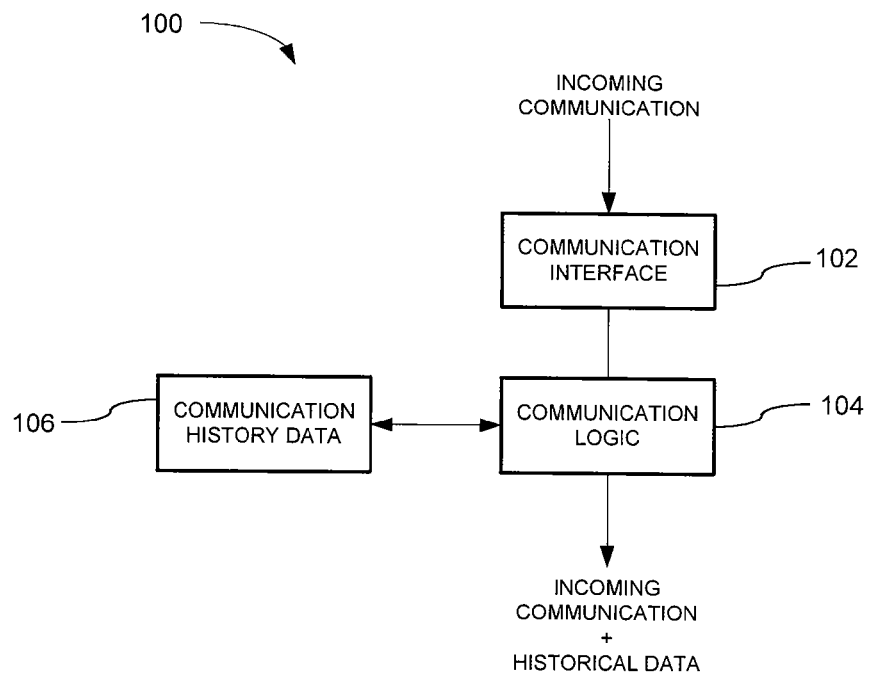
FIG. 1 illustrates an example of a communication system configured for providing communication history in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface and communication logic operable to receive data representative of a communication request via the interface, the communication request comprising data representative of an initiator of the request. The communication logic is responsive to the communication request to acquire data representative of a number of prior unanswered communication attempts since a predetermined time. The communication logic is configured to forward the data representative of an initiator of the request with the data representative of the number of prior unanswered communication attempts since the predetermined time.

In accordance with an example embodiment, there is disclosed herein a method comprising receiving a communication request comprising data identifying an initiator of the request. The method further comprises determining whether there are prior unanswered communications from the initiator since a last successful communication. Data identifying an initiator of the request and data representative of prior unanswered communications from the initiator since a last successful communication are then forwarded.

DESCRIPTION OF EXAMPLE EMBODIMENTS

This description provides examples not intended to limit the scope of the appended claims. The figures generally indicate the features of the examples, where it is to be understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described in an example embodiment herein is a unified communication system that automatically presents a recipient with a number of communication attempts (for example via e-mail, IM, voice mail, SMS, phone, video call, conference call, etc) since last contact with the caller. In particular embodiments, links may be provided to provide detailed information of those attempts. For example, a recipient of a telephone call may receive, in addition to caller ID identifying a caller, data such as "2nd Try," "3rd Try," etc. indicting how many communication attempts the caller has made since last contact with the caller. Optionally, the recipient may be provided with a user interface that enables the recipient to obtain additional, e.g. more detailed, data about the past communication attempts. In an example embodiment, the past communication attempts may not only include past phone call data, but may also include voice mails left by the caller that have not been played, text messages for which no response has been sent, un-responded e-mails, etc.

In an example embodiment, a color coding scheme may be used to indicate the number of past unanswered communication attempts. For example, green may indicate two attempts; yellow may indicate three or four attempts; and red may indicate five or more attempts. Moreover, the color thresholds may be configurable.

In an example embodiment, data representative of past communication attempts may be pulled from social networking sites and embedded with the caller ID information. In another example embodiment, data identifying the caller may be acquired from contact information stored at an end user device, such as a personal digital assistant (PDA), which can be used to identify past communication attempts by the caller.

FIG. 1 illustrates an example of a communication system 100 configured for providing communication history in accordance with an example embodiment. Communication interface 102 is configured to receive communication requests from a caller. Communication interface 102 may be suitably configured to receive telephone communications, Network (e.g. Internet Protocol "IP") communications, SMS messages, IM messages, MMS (Multimedia Messaging Service) messages, videoconferencing calls, conference calls, electronic mail (e-mail), etc. In particular embodiments, interface 102 may be configured to receive a plurality, and in some cases all, of the aforementioned communications.

Communication logic 104 is coupled to communication interface 102 and is operable to receive data representative of a communication request via interface 102. The data representative of a communication request comprises data representative of an initiator of the request (e.g. a caller or a sender of a message and/or source of the communication). "Logic," as used herein, includes but is not limited to hardware, firmware, software and/or combinations of each to perform a function(s) or an action(s) and/or to cause a function or action from another component. For example, based on a desired application or need, logic may include a software controlled microprocessor, discrete logic such as an application specific integrated circuit (ASIC), a programmable/programmed logic device, a memory device containing instructions or the like, or combinational logic embodied in hardware. Logic may also be fully embodied as software.

Communication logic 104 is responsive to receiving the communication request to automatically acquire data representative of a number of prior unanswered communication attempts from communication history data 106. Communication history data 106 may suitably be data stored locally with communication logic 104 (e.g. an associated memory) or may be data stored remotely (for example social networking website), communication logic 104 being configured to pull the data from communication history data 106. In the case in which there is previous communication history with the initiator, communication logic 104 retrieves data representative of communication attempts since the last successful communication. As used herein, an unanswered communication may be any of missed telephone calls, missed videoconference calls, missed conference calls, pending voice mail messages, unacknowledged e-mails, unacknowledged SMS text messages, unacknowledged MMS messages, etc. "Successful communication," as used herein, includes any communication where the recipient acknowledged the communication or communication was established between the initiator and recipient, such as telephone calls that were actually completed, e-mails, IM, SMS text messages, videoconference call requests, and/or conference call requests that were acknowledged (e.g. a response was sent to the initiator). If no past successful communication is found, then all communication attempts are retrieved.

Communication logic 104 is configured to forward the data representative of an initiator of the request with the data representative of the number of prior unanswered communication attempts. In an example embodiment, where communication logic 104 is implemented as part of a call manager, the data representative of an initiator of the request with the data representative of the number of prior unanswered communication attempts is forwarded to a device associated with the destination (e.g. called party). In another example embodiment, which will be described in more detail herein infra, communication logic 104 is implemented as part of an end user device such as a personal digital assistant (PDA) and the data is forwarded to an output device such as a display or speaker.

For example, if the communication request received at communication interface 102 is a telephone call, the data representative of the initiator of the request may suitably comprise a telephone number of the initiator. Communication logic 104 may search communication history data 106 for prior unanswered telephone calls from the initiator. Note that multiple phone numbers may be associated with an initiator, such as Office, Cellular, etc. Communication logic 104 can be configured to search all telephone numbers associated with an initiator, or communication logic 104 can be configured to limit the search to predefined telephone numbers. In addition to unanswered telephone calls from the initiator, communication logic 104 can be configured to search communication history data 106 for unanswered (e.g. unacknowledged) text messages. In an example embodiment, communication logic 104 searches communication history data 106 for unanswered voice mail messages or voice mail messages that haven't been played back yet. In an example embodiment, communication logic 104 searches communication history data 106 for unanswered and/or unacknowledged instant message requests. In yet another example embodiment, communication logic 104 searches communication history data 106 for unanswered and/or unacknowledged electronic mail messages. Communication logic 104 can be configured to include or not include certain electronic mail messages based on user-defined criteria. For example, electronic mail messages sent to a group (or a group greater than a certain size) may be ignored, while electronic mail messages sent to the recipient individually may be included. In still yet another example embodiment, communication logic 104 searches communication history data 106 for unacknowledged and/or unanswered video call requests. In another example embodiment, communication logic 104 searches communication history data 106 for unanswered conference call requests.

Figure 3:
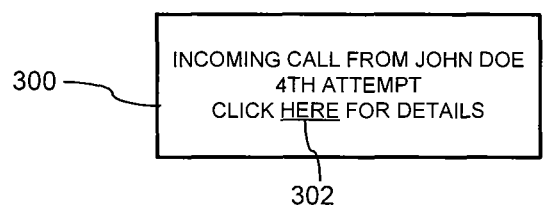
FIG. 3 illustrates an example of a display providing data representative of previous un-responded communication attempts from a caller.
Figure 4:
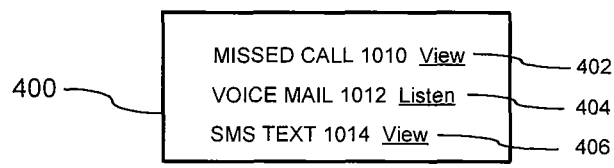
FIG. 4 illustrates an example display providing additional details of previous un-responded communication attempts from a caller.

In an example embodiment, apparatus 100 may further include an output device (not shown, see e.g. FIGS. 3 and 4) coupled to communication logic 104. The output device is configured to receive the data representative of the initiator of the request and the data representative of the number of prior unanswered communication attempts from the communication logic and responsive to output the data. For example, as illustrated in FIGS. 3 and 4, the output device may be a display device. As another example, the output device may provide an audio output.

In an example embodiment, the output device is further configured to provide an input to receive data representative of a selection from a user. The input enables a recipient to obtain additional detailed data for a prior unanswered communication attempt. For example, a user may select a link to request more detailed data, whereupon the output device may output a list of prior unanswered communication attempts. In addition, the output device can be configured to receive data representative of a selection of a prior unanswered communication attempt from the list and, responsive to receiving the selection, provide additional detailed data for the selected prior unanswered communication attempt. In an example embodiment, the additional detailed data comprises a time that the communication attempt was made and a type of service employed for the selected prior unanswered communication attempt (e.g. phone, voice mail, e-mail, text, etc.).

In an example embodiment, the output device may be operable to provide a color associated with the number of communication attempts. For example, the output device may use green to display a second communication attempt, yellow to display a third communication attempt, and red to display four or more communication attempts.

In an example embodiment, the output device enables a user to select types of communication that are to be included when determining the number of prior unanswered communication attempts. For example, a user may decide to include missed phone calls and text messages but exclude e-mail messages.

Figure 2:
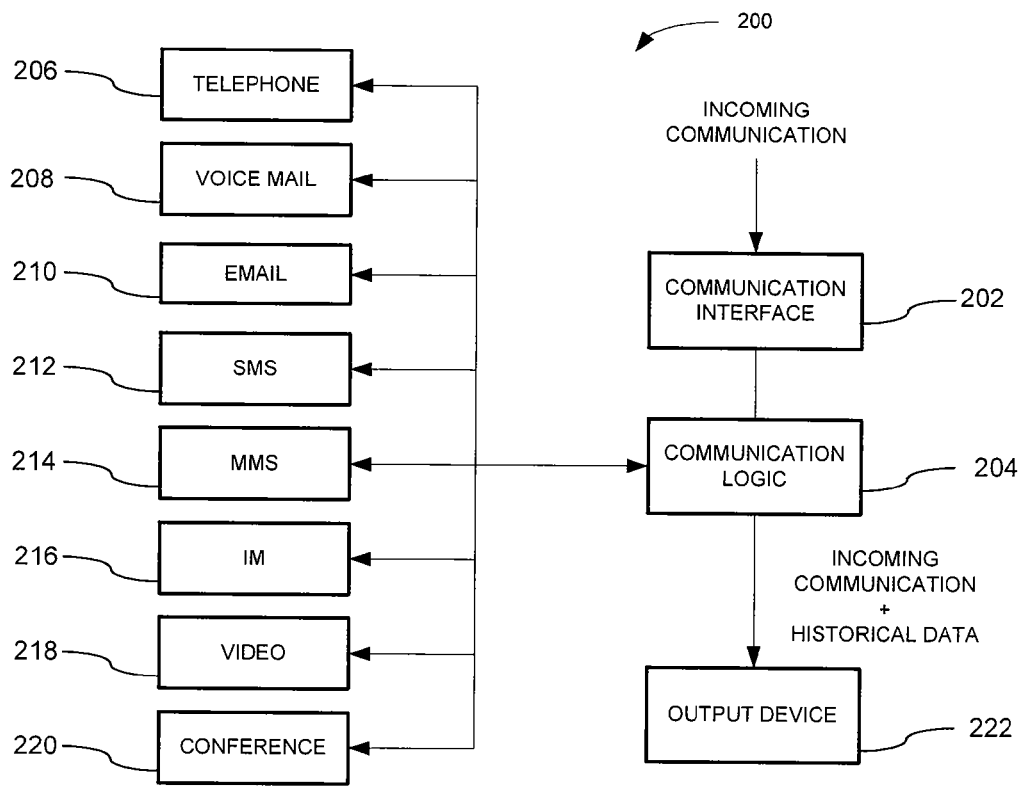
FIG. 2 illustrates an example of a communication system configured to acquire communication data from a variety of sources.

FIG. 2 illustrates an example of a communication system 200 configured to acquire communication data from a variety of sources. Communication logic 204 is configured to receive data representative of an incoming communication via communication interface 202. The data representative of an incoming communication includes information identifying the initiator of the communication. This enables communication logic 204 to search various sources for prior communication attempts since the last successful communication. For example, as illustrated, communication logic 204 may obtain telephone data 206 (such as data representative of missed calls), voice mail data 208 (for example, voice mails that have not been played back or for which no response has been sent), e-mail 210 (for example, unopened or unacknowledged e-mails), SMS text 212 (such as unopened or unacknowledged messages), MMS data 214 (such as unopened or unacknowledged messages), IM requests 216 (such as unopened or unacknowledged requests and/or messages), videoconferencing requests 218 (such as unopened or unacknowledged requests), conference call requests 220 (such as unopened or unacknowledged requests), and/or any combination of thereof. For example, if communication logic 204 has only telephone and SMS text data for an initiator, then communication logic 204 will only search telephone 206 and SMS 212 data for past communication attempts.

Communication logic 204 forwards the data representative of an incoming communication request and historical data that includes data representative of current unanswered communication attempts retrieved from any one or more of telephone data 206, voice mail data 208, e-mail 210, SMS text 212, MMS data 214, IM requests 216, videoconferencing requests 218, and/or conference call requests 220 to output device 222. Based on the search through the aforementioned data sources, communication logic 204 can determine a current number of prior unanswered communication attempts. The historical data sent to output device 222 may suitably comprise the current number of prior unanswered communication attempts and additional detailed information, such as will be illustrated in FIG. 4.

FIG. 3 illustrates an example of a display 300 providing data representative of previous un-responded communication attempts from a caller. For example, as illustrated in this example, display 300 outputs that the current incoming call is the 4th attempt from the initiator (John Doe in this example). Display 300 also provides a link 302 that a user may select to obtain additional data about the past communication attempts. In addition, as described herein supra, display 300 may also employ a color coding system as an aid to determining an estimate of the number of unanswered communication attempts (e.g. green is two attempts, yellow is 3-4 attempts, and red is 5 attempts or more).

FIG. 4 illustrates an example display 400 providing additional details of previous un-responded communication attempts from a caller. For example, a user may reach display 400 by selecting link 302 in FIG. 3. In this example, display 400 provides data indicating that a missed call from the initiator was logged at 10:10, a voice mail was received from the initiator at 10:12 and a SMS text was received from the initiator at 10:14. In addition, links are provided to enable a user to receive additional data for each communication attempt. For example, selecting link 402 displays additional details about the missed telephone call. For example, the telephone number from which the initiator called may be displayed, along with any caller ID information (e.g. home, office, cell). As another example, selecting link 404 may enable the user to listen to voice mail and/or obtain envelope information such as the phone number, length of message, etc. As still another example, selecting link 406 would allow a user to view the text message (and optionally links may be provided that allow the user to respond to the text message).

Figure 5:
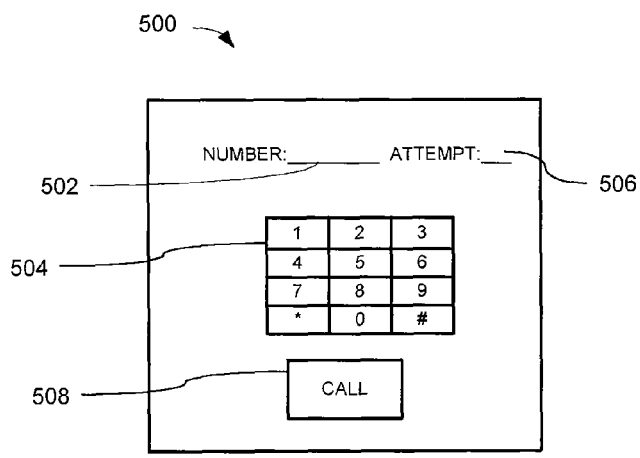
FIG. 5 illustrates an example of a telephone dialing system configured to acquire past communication data.

FIG. 5 illustrates an example of a telephone dialing system 500 configured to acquire past communication data. This embodiment provides a technique for an initiator to specify the number of times the initiator has attempted to contact the recipient. In this example, an initiator can enter the telephone number in the space provided at 502 using keypad 504. The initiator may then specify the number of times the initiator has attempted to contact the recipient in the space provided at 506 using keypad 504. The initiator would then select button 508 to place the call, at which point data representative of the number of times the initiator has attempted to contact the recipient will be sent to the recipient.

Figure 6:
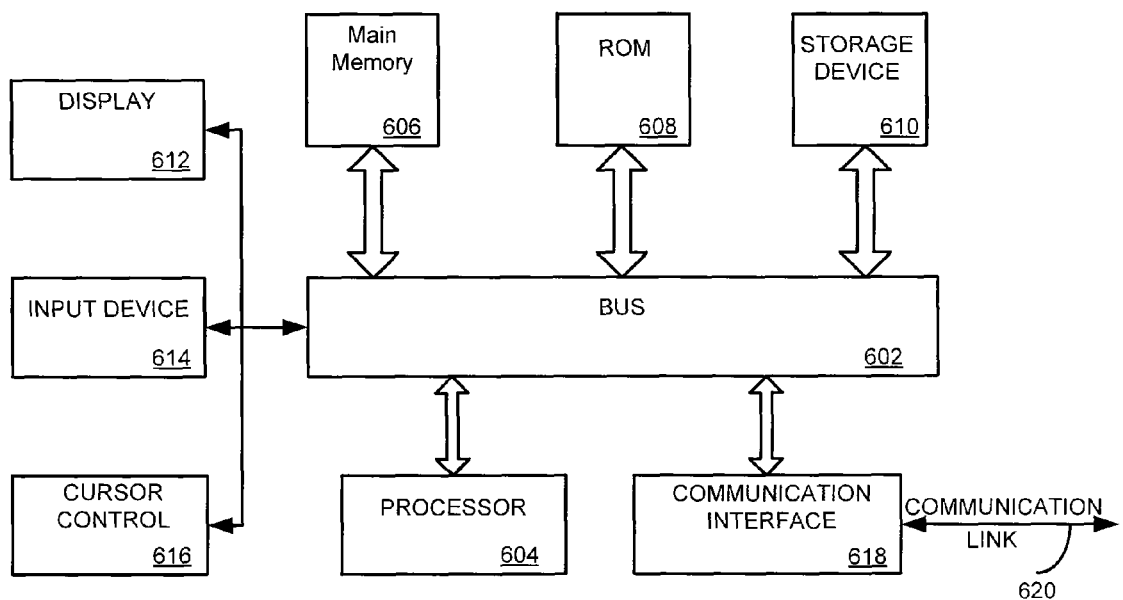
FIG. 6 illustrates a computer system upon which an example embodiment can be implemented.

FIG. 6 illustrates a computer system upon which an example embodiment can be implemented. Computer system 600 includes a bus 602 or other communication mechanism for communicating information and a processor 604 coupled with bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

In embodiments where the example embodiment is implemented on an end user device such as a PDA, computer system 600 may be coupled via bus 602 to a display 612, such as a cathode ray tube (CRT) or liquid crystal display (LCD), for displaying information to a computer user. An input device 614, such as a keyboard including alphanumeric and other keys, is coupled to bus 602 for communicating information and command selections to processor 604. Another type of user input device is a cursor control 616, such as a mouse, a trackball, or cursor direction keys, for communicating direction information and command selections to processor 604 and for controlling cursor movement on display 612. This input device typically has two degrees of freedom in two axes, a first axis (e.g. x) and a second axis (e.g. y), which allow the device to specify positions in a plane.

An aspect of the example embodiment is related to the use of computer system 600 for providing caller ID with communication history. According to an example embodiment, providing caller ID with communication history is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium," as used herein, refers to any medium that participates in providing instructions to processor 604 for execution. Such a medium may take many forms, including but not limited to non-volatile media and volatile media. Non-volatile media include, for example, optical or magnetic disks such as storage device 610. Volatile media include dynamic memory such as main memory 606. Common forms of computer-readable media include, for example, a floppy disk, a flexible disk, a hard disk, magnetic cards, paper tape, any other physical medium with patterns of holes, a RAM, a PROM, an EPROM, a FLASHPROM, a CD, a DVD or any other memory chip or cartridge, or any other medium from which a computer can read.

Computer system 600 also includes a communication interface 618 coupled to bus 602. Communication interface 618 provides a two-way data communication coupling computer system 600 to a communication link 620. Communication link 620 may be connected to one or more data and/or telephone networks that enable the device to communicate with other devices.

Figure 7:
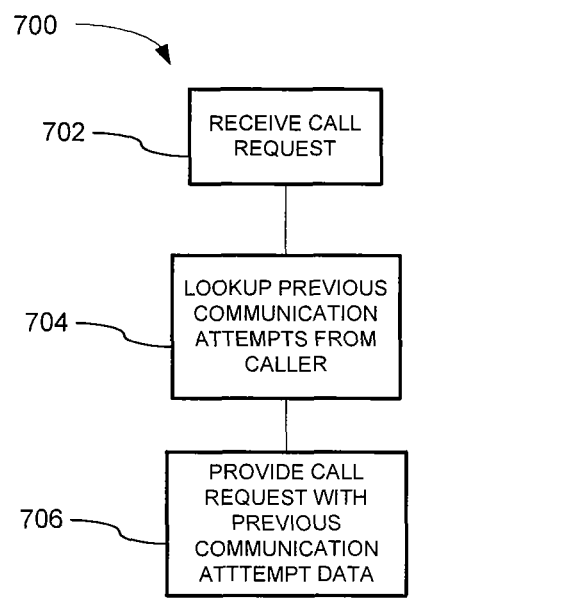
FIG. 7 illustrates a methodology in accordance with an example embodiment.

In view of the foregoing structural and functional features described above, a methodology 700 in accordance with an example embodiment will be better appreciated with reference to FIG. 7. While, for purposes of simplicity of explanation, the methodology of FIG. 7 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement the methodology. The methodology described herein is suitably adapted to be implemented in hardware, software, or a combination thereof.

At 702, a communication request is received. The communication request comprises data identifying an initiator of the request. The communication request may be any one of, but is not limited to, a telephone call, a voice mail notification, a SMS text message, a MMS message, an e-mail, an IM message, a videoconference request, or a conference call request.

At 704, a search is made to determine whether there are any previous communication attempts from the initiator (caller) made since the last successful communication. The types of communications that are searched are user-configurable (for example, a user may wish to include telephone calls, voice mails, and SMS text messages but exclude e-mail and MMS messages). If the method is being implemented at a call manager, the call manager may acquire the information from a plurality of sources such as social networking sites, telephone data logs, and various servers associated with the recipient. In an example embodiment, contact data is employed to determine the various addresses for the initiator to determine whether the initiator has made previous unanswered communication attempts.

At 706, data identifying the initiator of the request and data representative of prior unanswered communications from the initiator are forwarded. If the method is being implemented on a call manager or other similar server, the data is forwarded to the recipient's communication device (for example telephone, VoIP phone, computer terminal, PDA, etc.). If the method is being implemented on an end user device such as a PDA, the data is provided to the user.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
an interface;
communication logic operable to receive data representative of a communication request via the interface, the communication request comprising data representative of an initiator of the request; and
an output device coupled to the communication logic;
wherein the communication logic is responsive to the communication request to automatically acquire data representative of a current number of prior unanswered communication attempts while receiving the communication request from the initiator;
wherein the communication logic is configured to forward data representative of the communication request, the data representative of an initiator of the request with the data representative of the current number of prior unanswered communication attempts from the initiator to the output device;
wherein the output device simultaneously presents the communication request, the data representative of the initiator of the request and the data representative of the current number of prior unanswered communications from the initiator while receiving the communication request from the initiator; and,
wherein the current number of prior unanswered communication attempts comprises a combination of an unanswered telephone call, an unanswered voice mail message, an instant message request, and an unanswered electronic mail message.

2. The apparatus of claim 1, wherein the current number of prior unanswered communication attempts corresponds to unanswered communication attempts after the last successful communication with the initiator.

3. The apparatus of claim 1, wherein the current number of prior unanswered communication attempts includes all unsuccessful communication attempts responsive to there being no prior successful communication with the initiator.

4. The apparatus of claim 1, wherein the communication request is a telephone call and the data representative of the initiator of the request comprises a telephone number of the initiator.

5. The apparatus of claim 4, wherein the number of prior unanswered communication attempts comprises an unanswered text message.

6. The apparatus of claim 4, wherein the number of prior unanswered communication attempts comprises a video call request.

7. The apparatus of claim 4, wherein the number of prior unanswered communication attempts comprises a conference call request.

8. The apparatus of claim 1, wherein the output device is further configured to provide an input to receive data representative of a selection to provide additional detailed data for a prior unanswered communication attempt.

9. The apparatus of claim 8, wherein the output device is responsive to receiving data representative of a selection to provide additional detailed data to provide a list of prior unanswered communication attempts.

10. The apparatus of claim 9, wherein the output device is configured to receive data representative of a selection of a prior unanswered communication attempt from the list and, responsive to receiving the selection, to provide additional detailed data for the selected prior unanswered communication attempt.

11. The apparatus of claim 10, wherein the additional detailed data comprises a time of the communication attempt and a type of service employed for the selected prior unanswered communication attempt.

12. The apparatus of claim 1, wherein the output device further comprises an interface for receiving data representative of a selection of which types of communication are to be included when determining the number of prior unanswered communication attempts.

13. The apparatus of claim 1, wherein the control logic looks up the data representative of an initiator in a contact list to ascertain one of a group consisting of a telephone number associated with the initiator, an electronic mail address associated with the initiator, a text message address associated with the initiator, an instant messenger address associated with the initiator, and any combination thereof.

14. The apparatus of claim 1, further comprising a display;
wherein the communication logic is further configured to display data representative of the initiator of the request in a color corresponding to the number of prior unanswered communication attempts since the predetermined time.

15. A method, comprising:
receiving a communication request comprising data identifying an initiator of the request;
automatically determining whether there are prior unanswered communications from the initiator since a last successful communication while receiving the communication request from the initiator; and
simultaneously presenting the data representative of the communication request, the data identifying the initiator of the request and data representative of prior unanswered communications from the initiator since a last successful communication while receiving the communication request from the initiator;
wherein the prior unanswered communications comprises a combination of missed telephone calls, un-listened-to voice mails, and unanswered electronic mail messages and instant messages from the initiator since a last successful communication.

16. Logic encoded in a non-transitory storage media for execution by a processor, and when executed operable to:
obtain data representative of a communication request that comprises data identifying an initiator of the request;
automatically determine whether there are prior un-responded communications from the initiator since a last successful communication while receiving the communication request from the initiator; and
simultaneously presenting data representative of the communication request, the data identifying the initiator of the request and data representative of a number of prior un-responded communications from the initiator since a last successful communication while receiving the communication request from the initiator;
wherein the prior un-responded communications comprises a combination of missed telephone calls, un-listened-to voice mails, and unanswered electronic mail messages and instant messages from the initiator since a last successful communication.

* * * * *